(12) United States Patent
Paatero et al.

(10) Patent No.: US 12,040,698 B2
(45) Date of Patent: Jul. 16, 2024

(54) UNINTERRUPTIBLE POWER SUPPLY, UPS, FOR CONNECTING A MULTIPHASE LOAD TO AN AC SOURCE AND A DC SOURCE

(71) Applicant: ABB Schweiz AG, Baden (CH)

(72) Inventors: Esa-kai Paatero, Helsinki (FI); Nicola Notari, Gentilino (CH)

(73) Assignee: ABB Schweiz AG, Baden (CH)

( * ) Notice: Subject to any disclaimer, the term of this patent is extended or adjusted under 35 U.S.C. 154(b) by 133 days.

(21) Appl. No.: 17/691,798

(22) Filed: Mar. 10, 2022

(65) Prior Publication Data

US 2022/0200330 A1  Jun. 23, 2022

Related U.S. Application Data

(63) Continuation of application No. PCT/EP2020/075360, filed on Sep. 10, 2020.

(30) Foreign Application Priority Data

Sep. 12, 2019 (EP) .................................... 19197041

(51) Int. Cl.
*H02M 1/42* (2007.01)
*H02J 9/06* (2006.01)
(Continued)

(52) U.S. Cl.
CPC ........... *H02M 1/4233* (2013.01); *H02J 9/061* (2013.01); *H02J 9/062* (2013.01); *H02M 1/0067* (2021.05);
(Continued)

(58) Field of Classification Search
CPC ............. H02M 1/0043; H02M 1/0067; H02M 1/4233; H02M 7/217; H02M 7/487;
(Continued)

(56) References Cited

U.S. PATENT DOCUMENTS 8,538,593 B2   9/2013 Sun et al.
2013/0113285 A1  5/2013 Hyde et al.
(Continued)

FOREIGN PATENT DOCUMENTS

CN   102195525 A   9/2011
CN   102739100 A   10/2012
(Continued)

OTHER PUBLICATIONS

Translation of CN 109842287 A, published Jun. 4, 2019, downloaded from Espacenet, Sep. 20, 2023. (Year: 2019).*
(Continued)

*Primary Examiner* — Hal Kaplan
(74) *Attorney, Agent, or Firm* — Leydig, Voit & Mayer, Ltd.

(57) ABSTRACT

A system and method for an uninterruptible power supply (UPS) includes a first converter assembly, a second converter assembly, a third converter assembly, a first controlled device configured for disconnecting at least two converters of the first converter assembly from and AC source, and a second controlled device configured for connecting at least two of the first converters together, and comprising the step of: opening the first controlled device and closing the second controlled device such that the first converter assembly transfers energy between split DC link halves to maintain voltage regulation of the DC link with respect to the midpoint reference.

16 Claims, 12 Drawing Sheets

(51) Int. Cl.
    *H02M 1/00*     (2007.01)
    *H02M 7/217*     (2006.01)
    *H02M 7/483*     (2007.01)
    *H02M 7/487*     (2007.01)
    *H02M 7/537*     (2006.01)

(52) U.S. Cl.
    CPC ......... *H02M 7/217* (2013.01); *H02M 7/4833* (2021.05); *H02M 7/487* (2013.01); *H02M 7/537* (2013.01); *H02M 1/0043* (2021.05)

(58) Field of Classification Search
    CPC ...... H02M 7/537; H02M 7/4833; H02J 9/061; H02J 9/062
    USPC .......................................................... 307/64
    See application file for complete search history.

(56) References Cited

U.S. PATENT DOCUMENTS

| | | | |
|---|---|---|---|
| 2014/0084898 A1 | 3/2014 | Pan et al. | |
| 2017/0099012 A1* | 4/2017 | Niwa | H02M 7/219 |
| 2019/0267889 A1* | 8/2019 | McBryde | H02M 1/088 |

FOREIGN PATENT DOCUMENTS

| | | | |
|---|---|---|---|
| CN | 202772663 U | 3/2013 | |
| CN | 103580264 A | 2/2014 | |
| CN | 104065157 A | 9/2014 | |
| CN | 104682375 A | 6/2015 | |
| CN | 205646811 U | 10/2016 | |
| CN | 106941276 A | 7/2017 | |
| CN | 107404239 A | 11/2017 | |
| CN | 107947338 A | 4/2018 | |
| CN | 109066964 A | 12/2018 | |
| CN | 109768706 A | 5/2019 | |
| CN | 109842287 A | 6/2019 | |
| CN | 110121825 A | 8/2019 | |
| JP | 60-13479 A | 1/1985 | |

OTHER PUBLICATIONS

European Patent Office, Extended European Search Report in European Patent Application No. 19197041.7, 7 pp. (dated Feb. 20, 2020).

European Patent Office, International Search Report in International Patent Application No. PCT/EP2020/075360, 3 pp. (dated Nov. 30, 2020).

European Patent Office, Written Opinion in International Patent Application No. PCT/EP2020/075360, 6 pp. (dated Nov. 30, 2020).

Wang et al., "A Dual-Energy-Source Uninterruptible Power Supply (UPS)," 2018 *International Power Electronics Conference*, IEEJ, 2270-2277 (May 20, 2018).

ABB, "Energy Portfolio Management—Nostradamus: Short-term renewable, demand and price forecasting," *ABB Library*, 4 pp. (2018).

ABB, "Load management with Ekip Power Controller for SACE Emax 2," White paper, *ABB Library*, 35 pp. (2012).

Hippert et al., "Neural Networks for Short-Term Load Forecasting: A Review and Evaluation," *IEEE Transactions on Power Systems*, 16(1): 44-55 (Feb. 2001).

The Patent Office of the People's Republic of China, Office Action in Chinese Patent Application No. 202080062406.6, 13 pp. (dated Jul. 29, 2023).

* cited by examiner

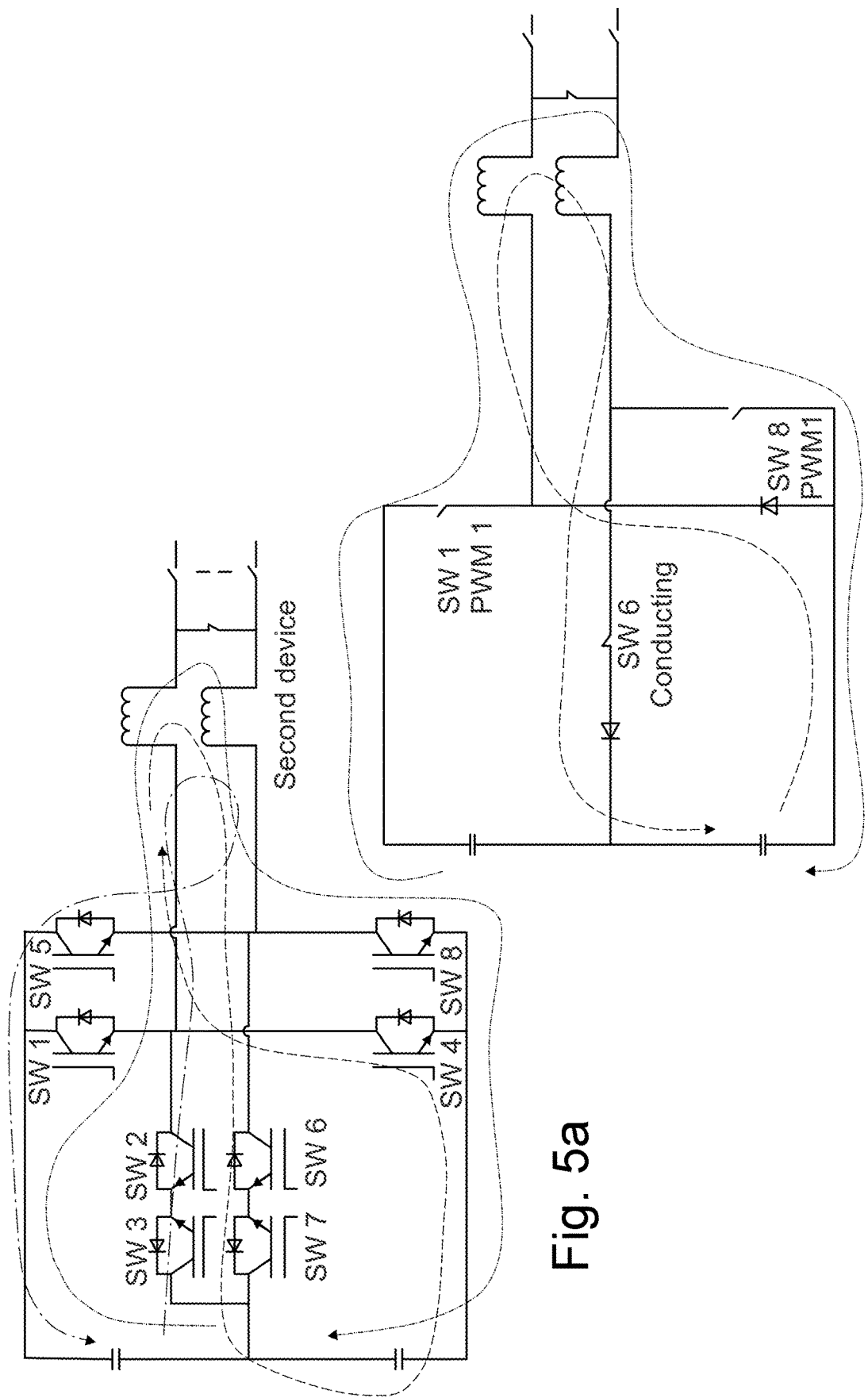

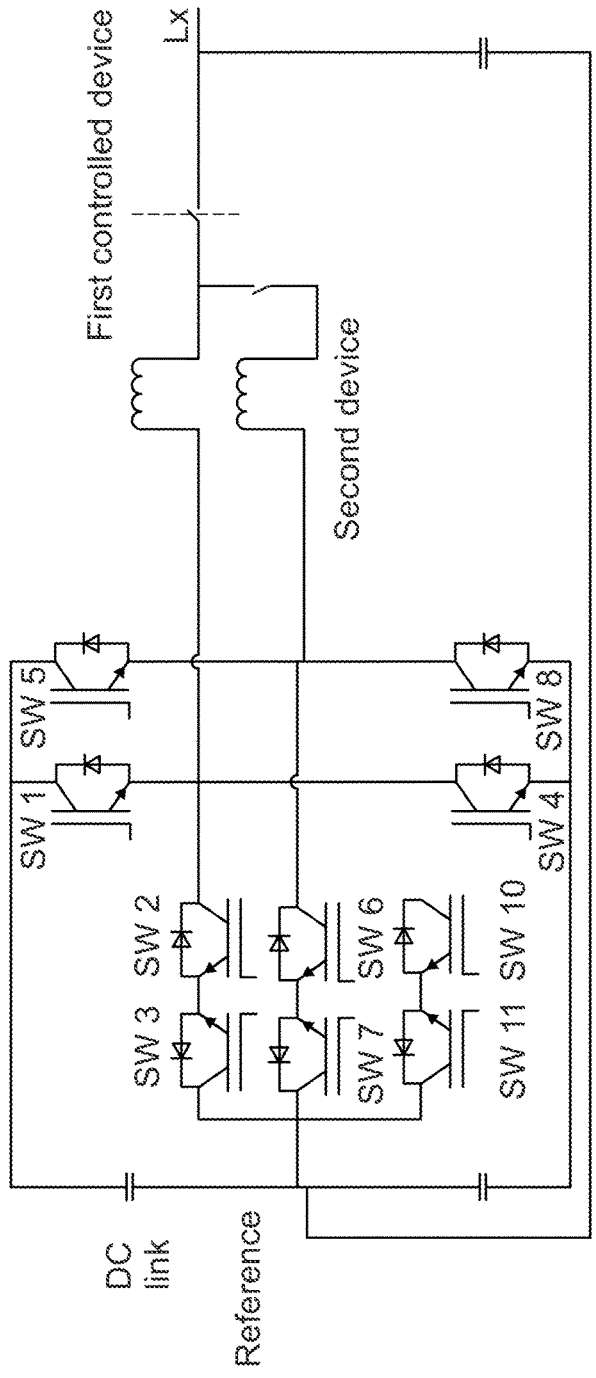
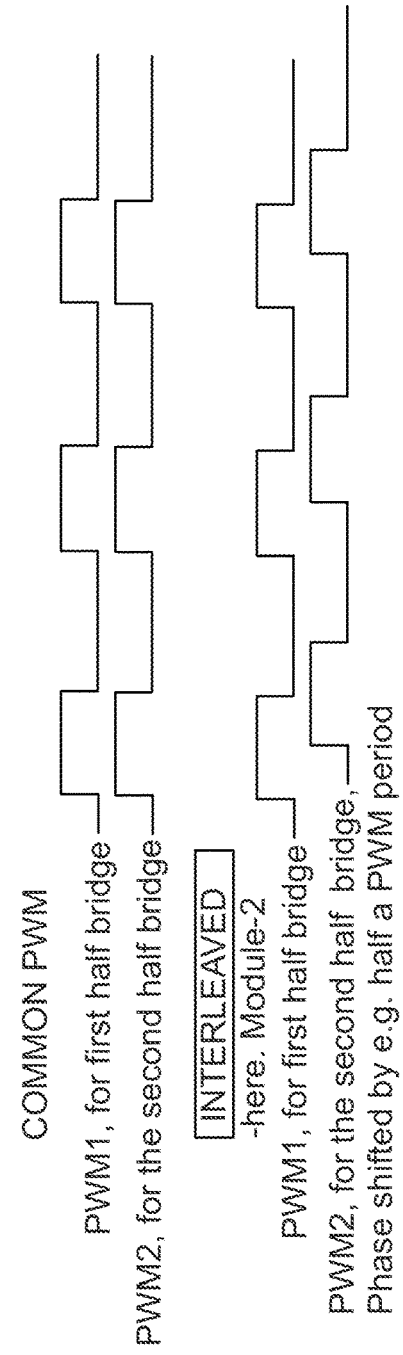
Fig. 11a
Fig. 11b
Fig. 11c

UNINTERRUPTIBLE POWER SUPPLY, UPS, FOR CONNECTING A MULTIPHASE LOAD TO AN AC SOURCE AND A DC SOURCE

CROSS-REFERENCE TO RELATED APPLICATIONS

This patent application claims priority to International Patent Application No. PCT/EP2020/075360, filed on Sep. 10, 2020, which claims priority to European Patent Application No. EP19197041.7, filed on Sep. 12, 2019, both of which are incorporated herein in their entirety by reference.

BACKGROUND OF THE INVENTION

Power quality events in electrical installations are an important issue. Power quality events comprise any kind of disturbances of an AC source covering from for example sags or failures of a single phase of the AC source up to outages of entire multi-phase AC source. In order to deal with power quality events, uninterruptible power supply devices and uninterruptible power supply systems to provide uninterruptible power supply, UPS, to a load.

A typical UPS system respectively UPS device comprises an AC/DC converter, also referred to as rectifier, and an output converter, also referred to as inverter. The AC/DC converter and the output converter are inter-connected by a DC link having positive and negative bus bars respectively rails or simply links. The DC link has a midpoint reference, a positive reference and a negative reference, which are usually connected by two capacitances provided in series. The rectifier is often provided as half bridge boost converter maintaining a regulated split via the positive and negative rails of the DC link versus an internal and/or a source reference, such as commonly source Neutral. Furthermore, the AC/DC converter is connected at a power supply side of the UPS to an AC source, and the output converter is connected at a load side of the UPS to a load, which is typically an AC load. Still further, the UPS comprises an additional DC/DC converter, also referred to as battery converter, and a DC source, whereby the DC/DC converter connects the DC source to the DC link. The DC source is typically a battery, which is charged via the DC/DC converter from the split DC link. Each UPS device of such UPS system can be connected to an individual battery, or the UPS devices of the UPS system can share a single battery or multiple batteries. The battery or batteries can be integral part of the UPS device or UPS system, or they can be provided separately. In any case, operation of the UPS device or the UPS system does not change, since this is more a question of definition.

UPS load may be dynamically such as comprising load transients or being steady state unbalanced between half cycles, i.e., the UPS load may have a DC component. On UPS operation under rectifier such load transient or steady state unbalanced between half cycles is not a major issue as rectifier control can still keep positive and negative DC links in independent regulation versus the reference. However, under stored energy mode only the full DC link or only one of the positive and negative DC links may be supported by the battery converter, the overall DC link voltage balance versus source neutral has then to be supported by other means, usually through an additional converter, such as a 'balancer' capable of controlled bi-directional transfer of energy between the positive and negative DC links for DC link voltage regulation. A separate balancer converter can be added, which, however, adds costs and complexity to the overall UPS system, and is thus not desired.

BRIEF SUMMARY OF THE INVENTION

The present disclosure relates to a system and method for operating an uninterruptible power supply, UPS, for connecting a multiphase load to an AC source and a DC source, the UPS comprising a first converter assembly comprising at least two first converters connected on a first side to the AC source and on a second side to a split DC link comprising two halves with a midpoint reference and a second converter assembly comprising a second converter connected on a first side to the DC link and on a second side to the load. The invention further relates to a respective UPS.

BRIEF DESCRIPTION OF THE SEVERAL VIEWS OF THE DRAWING(S)

The various aspects of the present disclosure will be apparent from and elucidated with reference to the embodiments described hereinafter as described as shown in the drawings.

Figure 3:
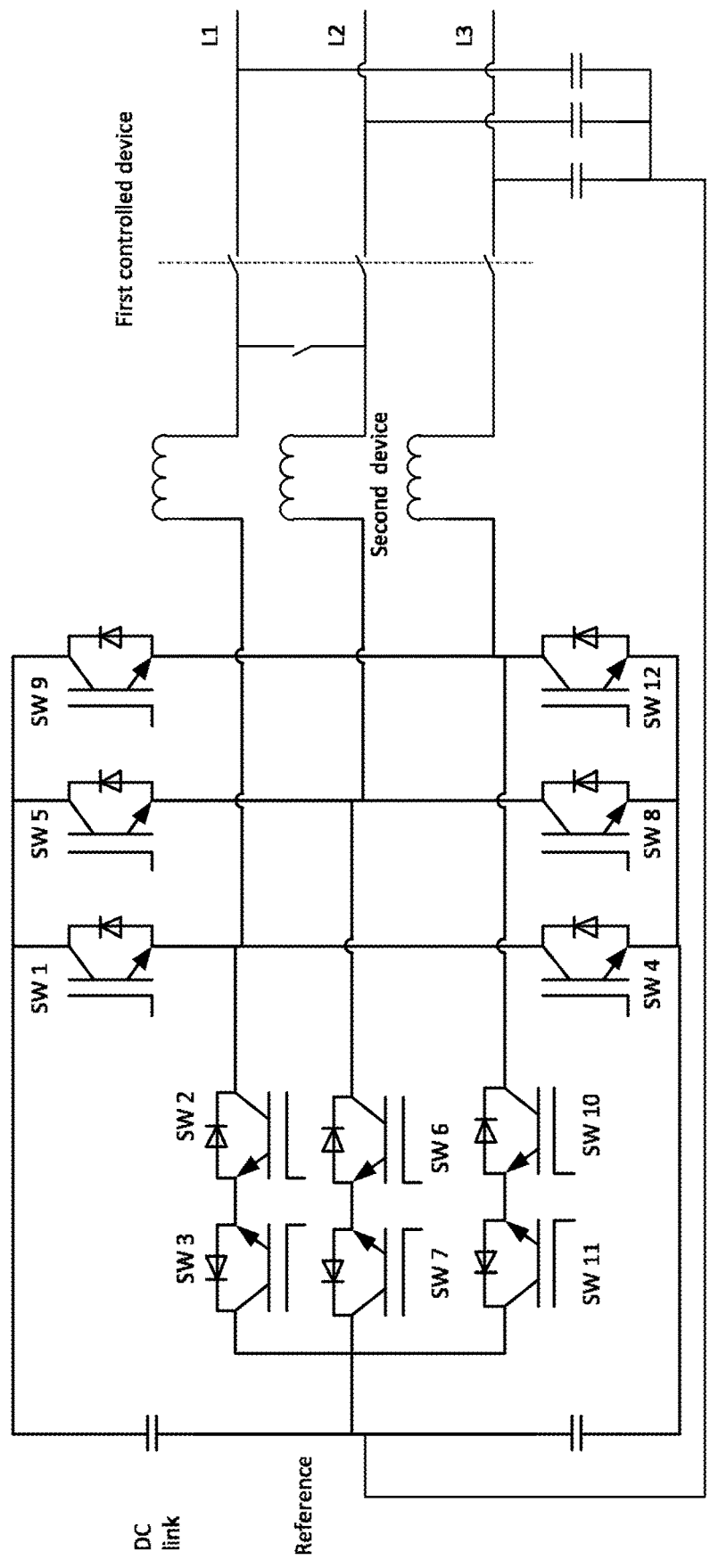
FIG. 3 shows the portion of the UPS system of FIG. 1 as a 3-level T-type circuit in a schematic view.

FIGS. 5*a* and 5*b* show, for the embodiment depicted in FIG. 3, the current path of energy transfer in a schematic view.

Figure 6A:
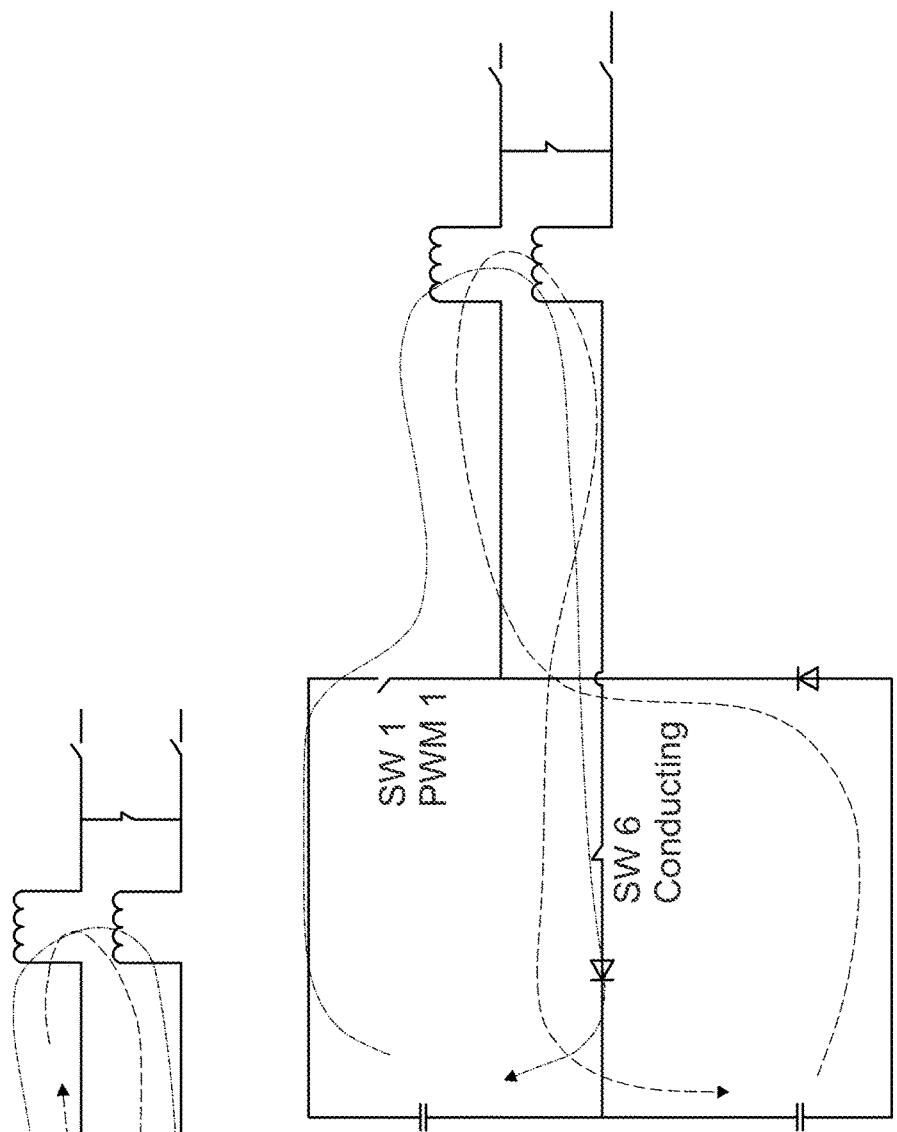
Figure 6B:
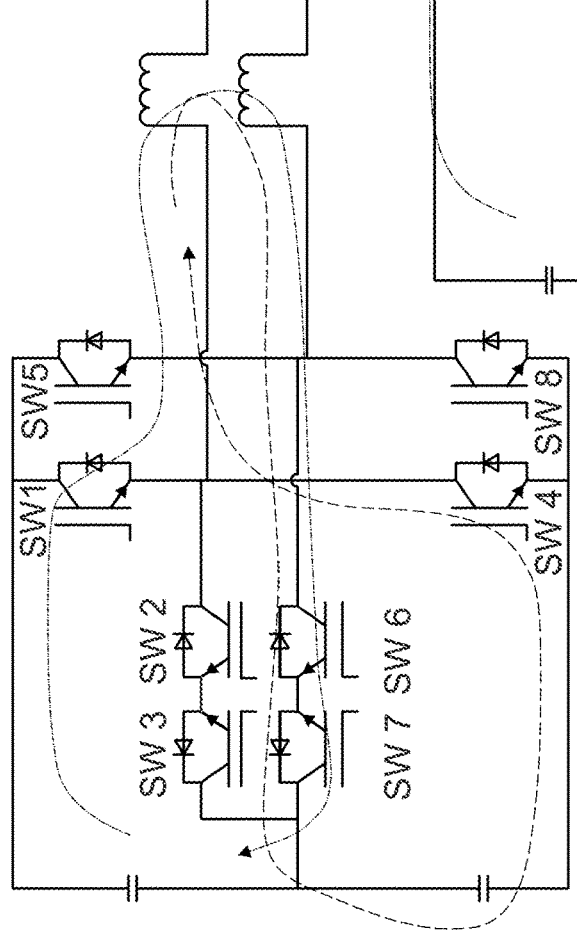

FIGS. 6*a* and 6*b* show a second current path alternative in respect to the embodiment shown in FIGS. 5*a* and 5*b* in a schematic view.

Figures 7A, 7B:
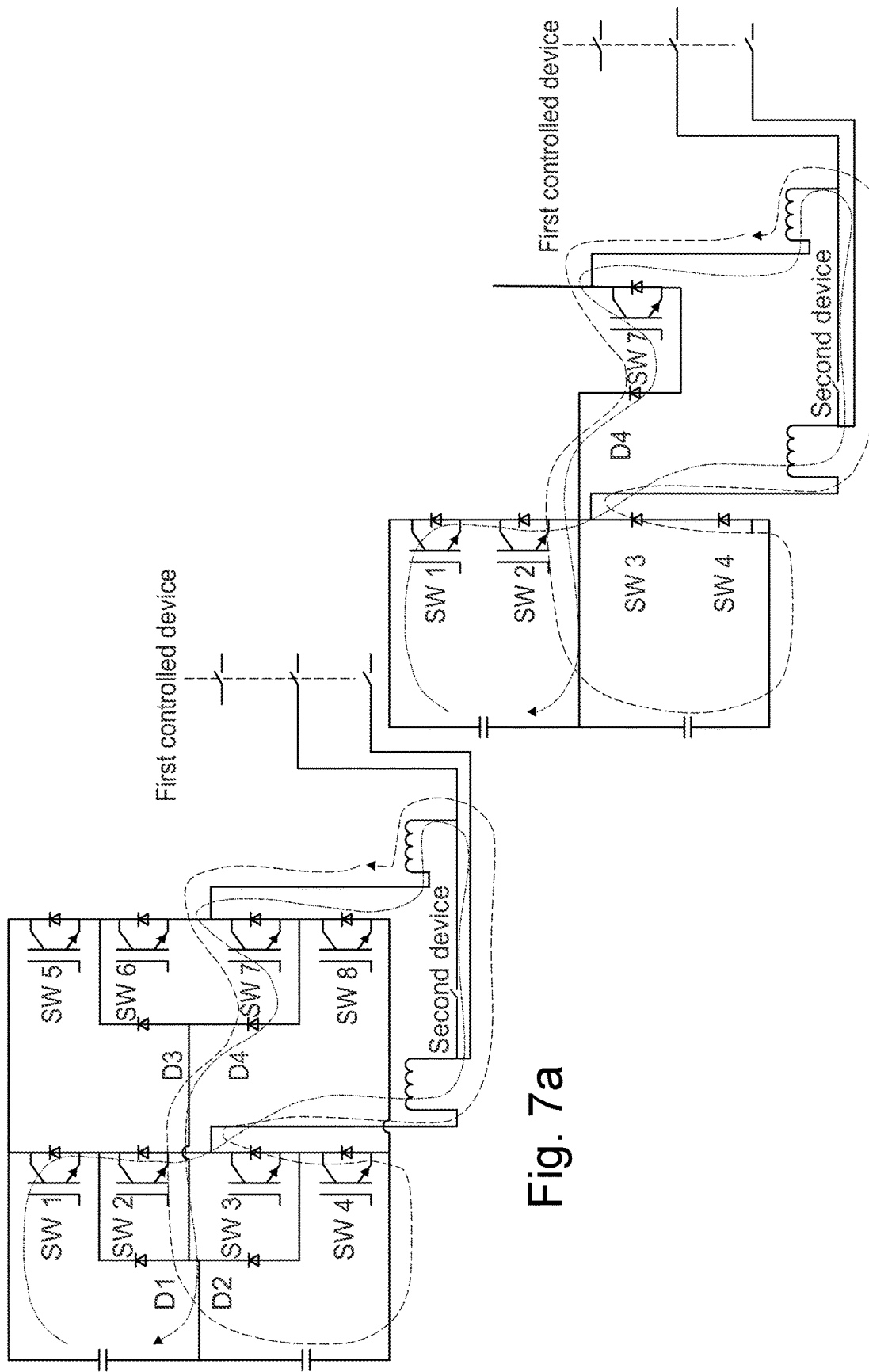

FIGS. 7*a* and 7*b* show a NPC-type embodiment with regard to the second current path alternative as depicted in FIGS. 6*a* and 6*b* in a schematic view.

Figures 8A, 8B:
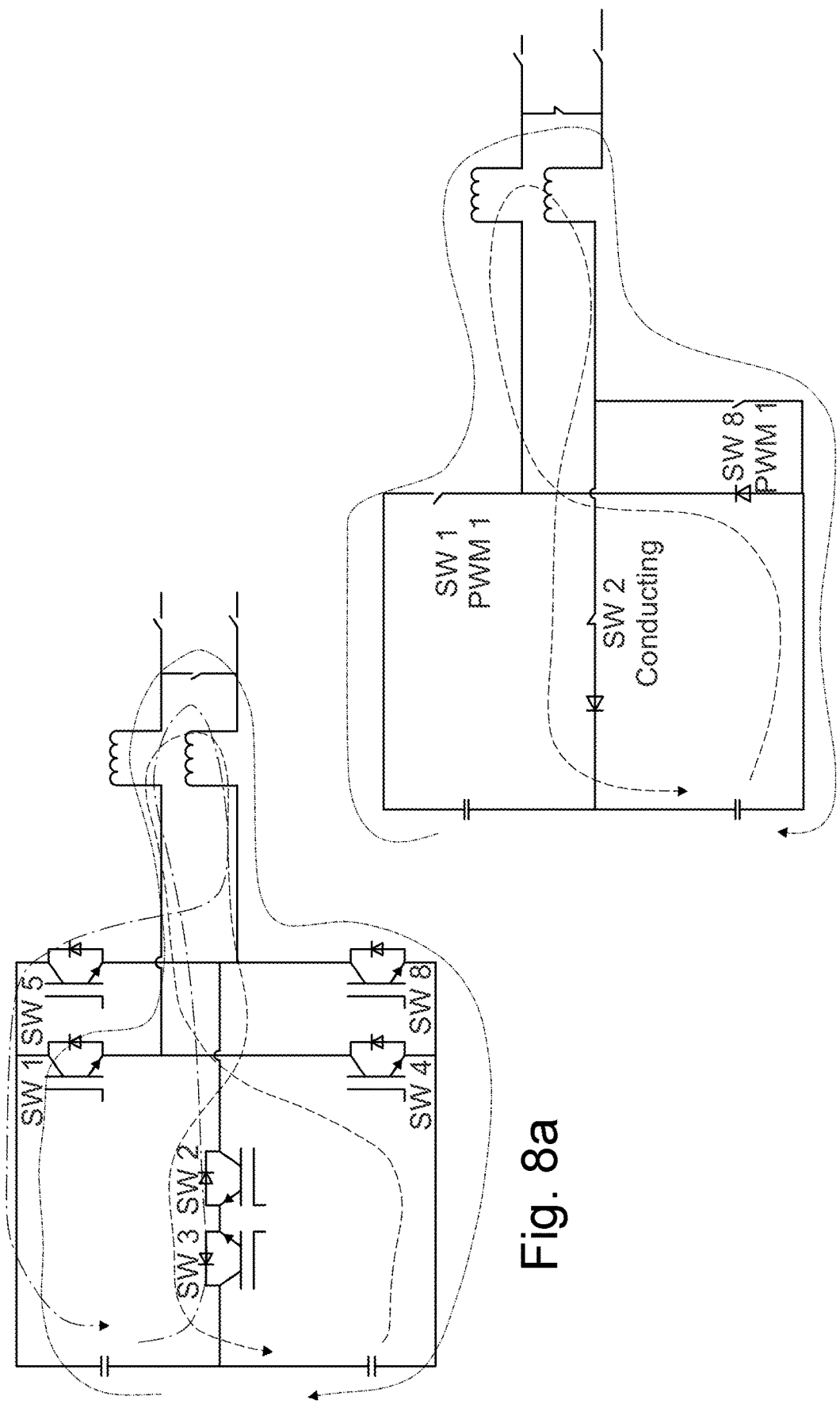

FIGS. 8*a* and 8*b* show a current path in regard to a 2-level topology in a schematic view, whereas current paths are shown in FIGS. 5*a* and 5*b*.

Figure 9B:
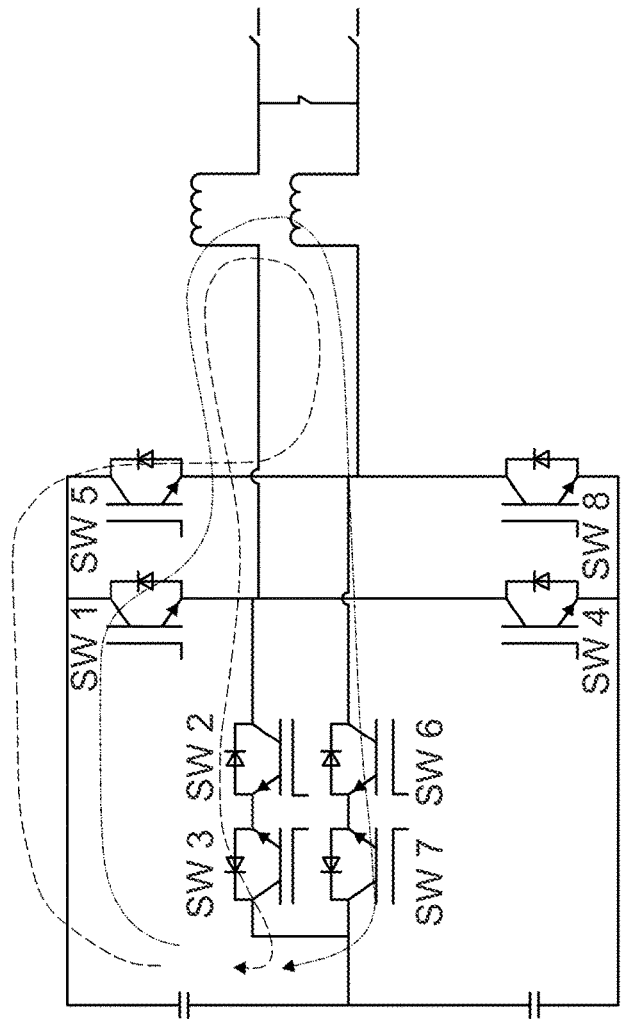
Figure 9A:
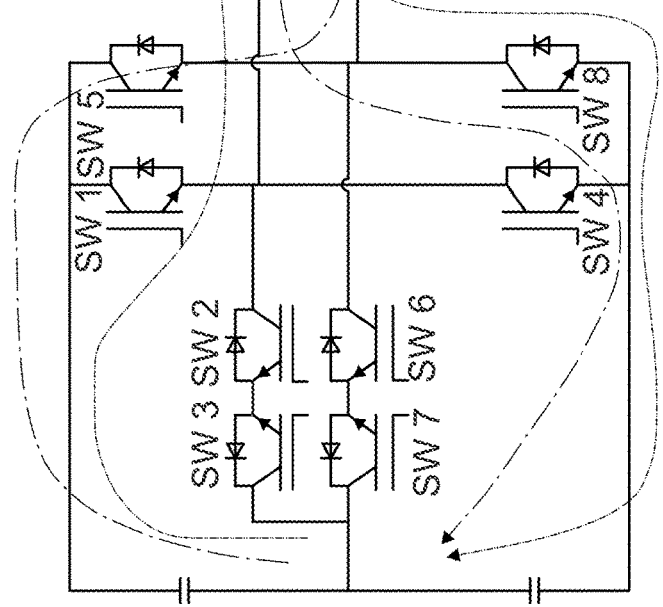

FIGS. 9*a* and 9*b* show a preferred embodiment for operating semiconductor switches with alternate current paths in a schematic view, in accordance with the disclosure.

Figure 10A:
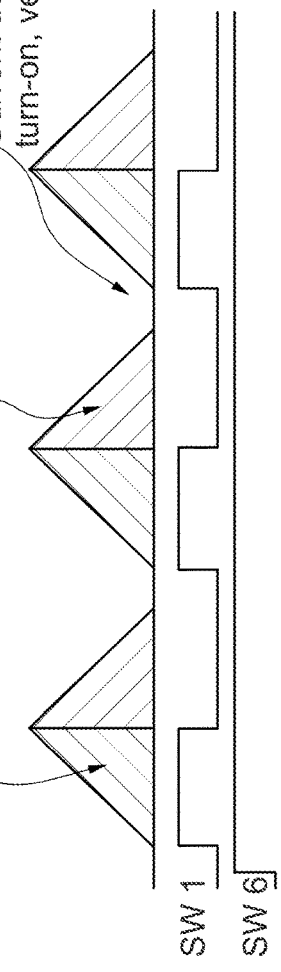
Figure 10B:
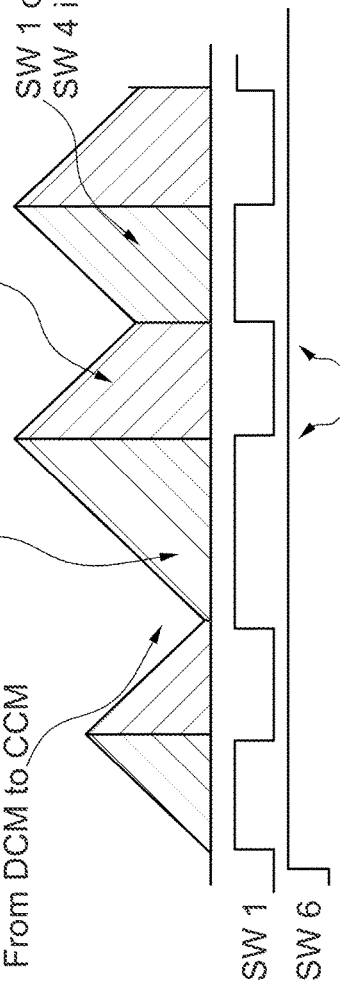

FIGS. 10*a* and 10*b* show, in reference to the embodiment shown in FIG. 9*b*, possible control schemes in a schematic view, in accordance with the disclosure.

FIGS. 11*a*, 11*b*, and 11*c* show a preferred embodiment with multiple first converters which either operate with a common PWM or interleaved with a PWM pattern in a schematic view, in accordance with the disclosure.

Figure 12:
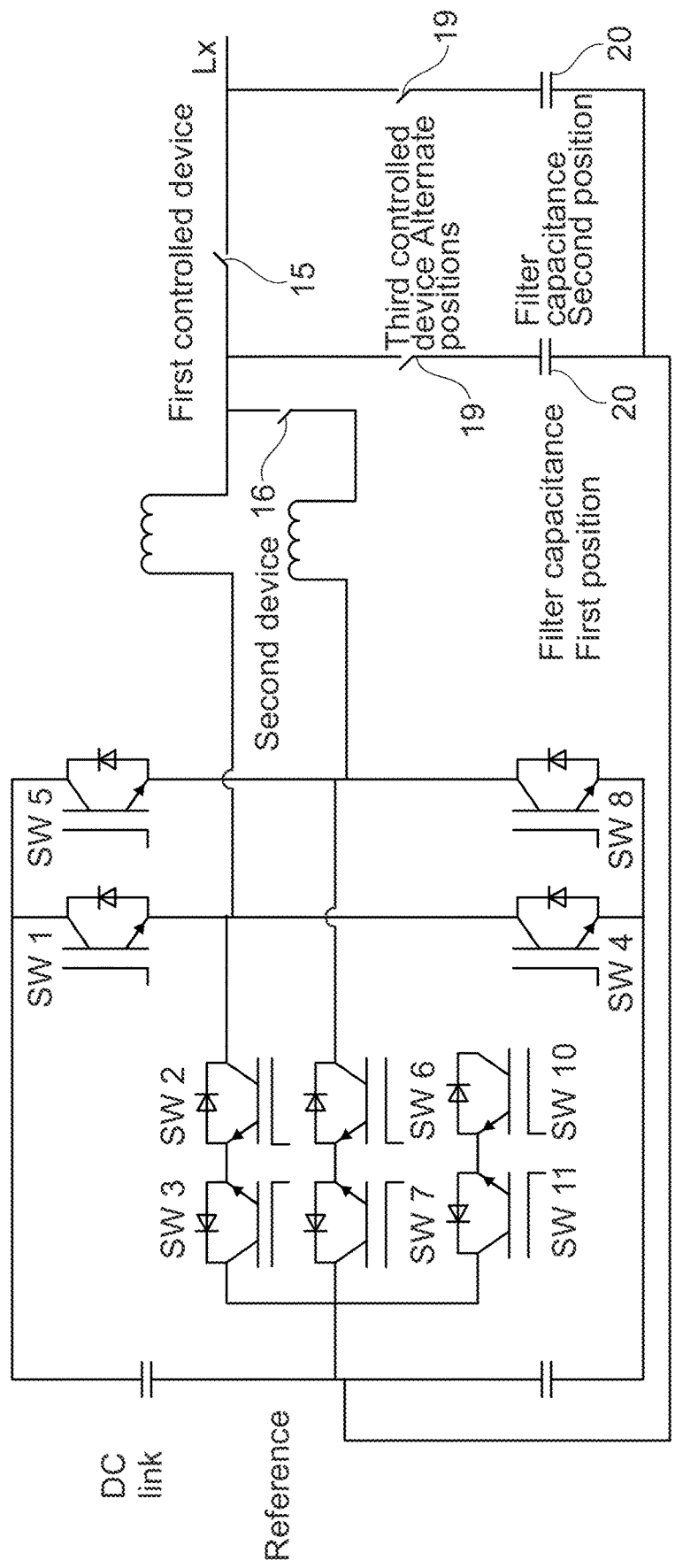

FIG. 12 shows an embodiment where a third controlled device and a filter element are provided in a schematic view, in accordance with the disclosure.

DETAILED DESCRIPTION OF THE INVENTION

In one aspect, the present disclosure provides a simpler and more cost-efficient solution compared to the prior art solution as described above. The object of the invention is solved by the features of the independent claims. Preferred embodiments are detailed in the dependent claims.

Thus, the object is solved by a method for operating an uninterruptible power supply, UPS, for connecting a load to an AC source and a DC source, the UPS comprising: a first converter assembly comprising at least two preferably independently controlled first converters connected on a first side to the AC source and on a second side to a split DC link comprising two halves with a midpoint reference; a second converter assembly comprising a preferably independently controlled second converter connected on a first side to the DC link and on a second side to the load; a third converter assembly comprising a preferably independently controlled third converter connected on a first side to the DC source and on second side to the DC link; a first controlled device configured for disconnecting at least two of the first converters from the AC source, and a second controlled device configured for connecting at least two of the first converters together, and comprising the step of: Opening the first controlled device, and, preferably at the same time, closing the second controlled device such that the first converter assembly transfers energy between the split DC link halves to maintain voltage regulation of the DC link in respect to the midpoint reference.

The proposed solution provides a simple, robust and cost-effective approach to implement a DC link balancer for two- or multi-level UPS or other converters. By opening the first controlled device, and, at the same time, closing the second controlled device the first converter assembly transfers energy between the split DC link halves such voltage regulation of the DC link in respect to the midpoint reference is maintained. In other words, the first converter assembly controllably transfers energy from either DC link half to the other, while a shared current may pass through filter inductors of the first converters. Thus, an existing converter of the UPS, i.e., the first converter assembly rectifier is used in a second mode of operation as balancer. The solution may require some hardware such as a control device for controlling opening the first controlled device, and, at the same time, closing the second controlled device, however, can be implemented at relatively modest cost and complexity compared to prior art solutions. Therefore, the proposed solution has a clear benefit for system cost, in addition through simplicity increasing overall robustness and reliability.

In particular, a 3-level converter topology allows for the proposed novel way to construct the balancer with very modest additional complexity, as recently legacy UPS 2-level half bridges are being replaced these days with basically similar structures of a 3-level construction, given that 3-level converter topologies provide a gain in efficiency being of the order of 1 to 2% from approximately 95 to 97% for the UPS. Thus, the proposed solution is preferably implemented for a UPS of a 3-level converter topology such as T- or NPC-type, with an appropriate control pattern, while the solution may be extended to converters with more levels. The proposed steps of opening the first controlled device, and, at the same time, closing the second controlled device such that the first converter assembly transfers energy between the split DC link halves to maintain voltage regulation of the DC link in respect to the midpoint reference is particularly well suited for UPS that have multiple converters in parallel on a phase or operate in an interleaved mode, a phase leg in effect consisting of two or more preferably independently controlled converters connected to a common power port such as an AC source phase and a PWM pattern phase shifted or not, as discussed later.

The UPS may have a stored energy source, usually referred to as 'battery', to maintain the DC link in the event of an AC source abnormal conditions so load support by the second converter assembly can be maintained without interruption. The battery is usually connected to the DC link through the third converter assembly to allow for voltage variation of the battery due to depletion or for other characteristics. The battery is not limited to common VRLA, it may be any practical DC source including fuel cell, photovoltaic, wind or other. Multiple third converter assemblies may be connected to and operate in parallel to support the DC link. For maximal simplicity a connection to the battery is preferably only two wire. The battery respectively DC source connection to the DC link and their common internal reference/Neutral may take several forms, such as only to link positive and negative ends or to just one of the links and Neutral. The load may an AC load, a DC load or a combination thereof and/or a multiphase load. The first controlled device can be configured for disconnecting all of the first converters individually from the AC source, and/or the second controlled device can be configured for connecting each two of the first converters together.

In a preferred implementation, the method comprises the step of operating the first converters, the second converter and/or the third converter with a pulse width, PWM, modulation or PWM phase shifted with an interleaved mode. PWM is advantageous in that less control capability is required, while interleaved is advantageous for optimizing for example filter ripple. Preferably, a plurality of second converters and/or third converters are provided.

According to a further preferred implementation, the second controlled device is provided as a permanently fixed connection between at least two of the first converters. Such way the second controlled device may be controlled or provided in an "uncontrolled" manner as a permanent connection such as a wire or bus bar, preferably as an interleaved phase converter. The second controlled device, in case controlled, and/or the first controlled device is preferably provided as relay, contactor or bidirectional semiconductor switch.

In another preferred implementation, the method comprises the step of operating the at least two third converters in parallel or time staggered for controlling energy draw off to a plurality of DC sources. Thereby, a plurality of third converters may be present, operated in parallel or time staggered based on availability and/or operating cost considerations.

According to a further preferred implementation, the first converters, the second converter and/or the third converter comprise Si, SiC and/or GaN semiconductors. Such semiconductors are characterized by improved performance, as said materials allow highly efficient operation in particular with 2-level topologies of a much simpler overall construction. Si, SiC and/or GaN semiconductors have switching losses much smaller than legacy Si semiconductors. Thus, operation may also be advantageous in a permanent Constant Current Mode, CCM, in addition to Discontinuous Current Mode, DCM, where current normally is allowed to go to zero before the next switching event thus greatly reducing overall losses. Said modes may be adopted and changed on an adaptive basis depending on load level and short and long term stress considerations, while potential energy throughput in CCM being generally higher.

In another preferred implementation, the method comprises the step of periodically changing phases by opening the first controlled device in respect to two periodically different phases, and, at the same time, closing the second controlled device in respect to the two periodically different phases. Such stress of the components of the UPS system, in particular of the semiconductor switches of the converters, can be advantageously reduced as alternate current paths are used. According to a further preferred implementation, the method comprises the step of operating the first converter assembly with swapped PWM between different first converters for periodically reversing direction of current flow in respect to the first converters. With such embodiment that basically uses alternate current paths stress, of the components of the UPS system, in particular of the semiconductor switches of the converters, can be advantageously reduced.

In another preferred implementation, the method comprises a third controlled device and a filter element connected in series between the first controlled device and the midpoint reference. Thereby, the series connection can be connected, in respect to the first controlled device, between a filter inductor associated to the first converter and the first controlled device or between the first controlled device and the AC source. Preferably the third controlled device is provided as electronic switch such as a semiconductor switch, or as a mechanical device such as for example a relay or contactor. The third controlled device provides an advantageous controlled disconnect capability, in particular for multiple mode operation of the UPS system. Further, the third controlled device may controllably decouple reactive current to the filter element.

In a further preferred implementation, the first converter assembly comprises a plurality of preferably independently controlled two level converters having a two-level midpoint and at least one controlled bidirectional semiconductor switch connected between the two-level midpoint and the midpoint reference. Such a respective phase can be operated in a 3-level mode when the first controlled device opens.

According to a further preferred implementation, the second controlled device is arranged between the first controlled device and the first converter assembly. Preferably, one terminal of the second controlled device is connected to one terminal of the first controlled device and one terminal of the first converter assembly respectively of a first converter thereof.

In a further preferred implementation, the first converter assembly comprises filter inductors associated to each first converter and the second controlled device is arranged between the first controlled device and the filter inductors. Thus, when the first controlled device opens and the second device closes to conduct current the first converter assembly controllably transfers energy from either DC link half to the other, while shared current passes through the filter inductors of the first converters.

According to a further preferred implementation, the first converter assembly is provided as rectifier, the second converter assembly is provided as inverter and/or the third converter assembly is provided as DC/DC converter. The UPS may further comprise a bypass element, preferably a switch, for connecting the AC source and the load, whereby the AC source may be common for the rectifier and the bypass element or separate feeds. The DC/DC converter may operate uni- or bi-directional. The first converter assembly, the second converter assembly and the third converter assembly couple through the DC link such way acting as energy storage for control and load characteristics. The AC source can be provided as single or multi-phase.

The object is further solved by an uninterruptible power supply, UPS, for connecting a load to an AC source and a DC source, the UPS comprising a first converter assembly comprising at least two preferably independently controlled first converters configured for connecting on a first side to the AC source and on a second side to a split DC link comprising two halves with a midpoint reference; a second converter assembly comprising a preferably independently controlled second converter configured for connecting on a first side to the DC link and on a second side to the load; a third converter assembly comprising a preferably independently controlled third converter configured for connecting on a first side to the DC source and on second side to the DC link; a first controlled device configured for disconnecting at least two of the first converters from the AC source; a second controlled device configured for connecting at least two of the first converters together, and a control device configured for opening the first controlled device, and, preferably at the same time, closing the second controlled device such that the first converter assembly transfers energy between the split DC link halves to maintain voltage regulation of the DC link in respect to the midpoint reference.

The control device is preferably provided as a computerized means, for example as a respectively programmed microprocessor. The control device may be associated to each UPS respectively UPS device or to the UPS system thereby controlling each UPS device of the UPS system. The control device may comprise a user interface or the UPS system may comprise a system level user interface. Further, the control device may comprise communication means for communicating with other control devices and/or external devices.

In a preferred implementation of the UPS the control device is configured for operating the first converters, the second converters and/or the third converters with a pulse width, PWM, modulation or PWM phase shifted with an interleaved mode. According to another preferred implementation the control device is configured for periodically changing phases by opening the first controlled device in respect to two periodically different phases, and, at the same time, closing the second controlled device in respect to the two periodically different phases.

In a preferred implementation the second controlled device is provided as a permanently fixed connection between at least two of the first converters. According to another preferred implementation the control device is configured for operating the third converters in parallel or time staggered for controlling energy draw off to a plurality of DC sources. In a preferred implementation the first converters, the second converter and/or the third converter comprise Si, SiC and/or GaN semiconductors.

According to another preferred implementation the control device is configured for operating the first converter assembly with swapped PWM between different first converters for periodically reversing direction of current flow in respect to the first converters. In a preferred implementation the UPS comprises a third controlled device and a filter element connected in series between the first controlled device and the midpoint reference. According to another preferred implementation the first converter assembly comprises a plurality of two level converters having a two level midpoint and at least one controlled bidirectional semiconductor switch connected between the two level midpoint and the midpoint reference.

In another preferred implementation the second controlled device is arranged between the first controlled device and the first converter assembly. According to another preferred implementation the first converter assembly comprises filter inductors associated to each first converter and the second controlled device is arranged between the first controlled device and the filter inductors. In another preferred implementation the first converter assembly is provided as rectifier, the second converter assembly is provided as inverter and/or the third converter assembly is provided as DC/DC converter.

Further embodiments and advantages of the UPS are directly and unambiguously derived by the person skilled in the art from the method as described before.

Figure 1:
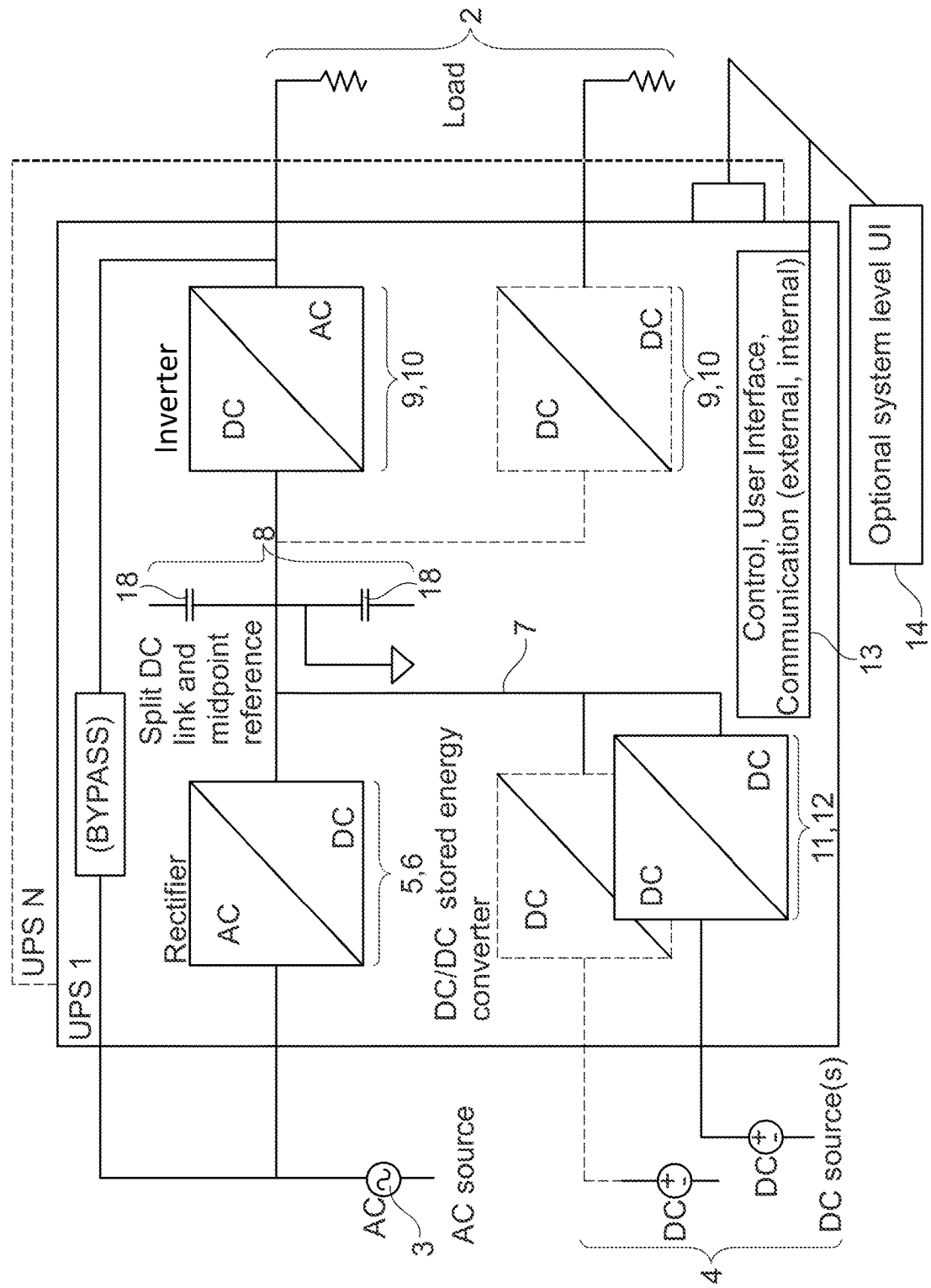
FIG. 1 shows a schematic view of an uninterruptible power supply, UPS, system in accordance with the disclosure.

FIG. 1 shows an uninterruptible power supply, UPS, system according to a preferred embodiment in a schematic view. The UPS system comprises a plurality of identical UPS devices, whereas two of them are shown and referred to as UPS 1 and UPS N. The UPS system connects a load 2 to an AC source 3 and a DC source 4.

Each UPS device 1 . . . N comprises a first converter assembly 5, which is provided as AC/DC rectifier and which comprises at least two independently controlled first converters 6, not shown. The first converter assembly 5 is connected on a first side to the AC source 3 and on a second side to a split DC link 7, which comprises two halves with a midpoint reference 8. Each UPS device 1 . . . N further comprises a second converter assembly 9, which is provided as inverter and comprises an independently controlled second converter 10 provided as DC/AC inverters, not shown. The second converter assembly 9 is connected on a first side to the DC link 7 and on a second side to the load 2. FIG. 1 shows another second converter assembly 9 connected in parallel to the second converter assembly 9. The first converters 6, the second converters 10 and the third converters 12 comprise Si, SiC and/or GaN semiconductors.

Each UPS device 1 . . . N even further comprises at least one third converter assembly 11, whereas two third converter assemblies 11 are depicted in FIG. 1 and connected in parallel. Each of the two third converter assemblies 11 comprises an independently controlled third converter 12, which are connected on a first side to the DC source 4 and on second side to the DC link 7. The third converter assemblies 11 are provided as DC/DC stored energy converters with respective third converters 12. The UPS system or each UPS device 1 . . . N further comprises a computerized control device 13 comprising a user interface and communication means for communicating with an optional UPS system level user interface 14.

Figure 2:
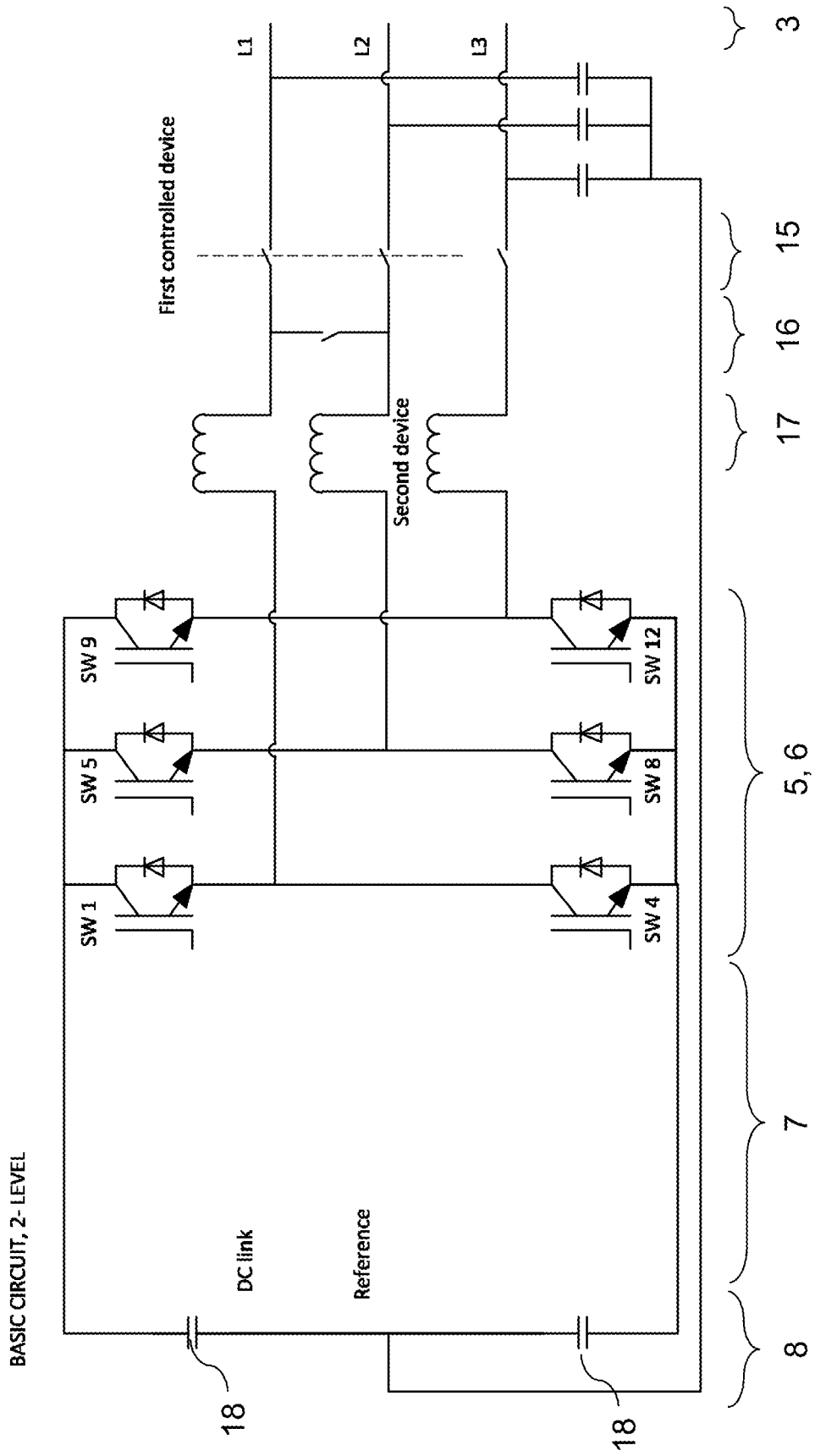
FIG. 2 shows a portion of the UPS system of FIG. 1 as a 2-level circuit in a schematic view.

By now referring to FIG. 2 showing a portion of the UPS system of FIG. 1 with a basic 2-level circuit, each UPS device 1 . . . N additionally comprises a first controlled device 15, which is provided as electronic switch for individually disconnecting at least two of the first converters 6 from the AC source 3. Within the embodiment depicted in FIG. 2 each phase L1, L2 and L3 is provided with such controlled switch, such as an electronic or mechanical switch.

Lastly, each UPS device 1 . . . N comprises a second controlled device 16, which in FIG. 2 is also provided as electronic or mechanical switch but can also be provided as permanent connection, not shown. The second controlled device 16 is configured for connecting at least two of the first converters 6 together. The first converter assembly 5 comprises filter inductors 17 associated to each first converter 6. The second controlled device 16 is arranged between the first controlled device 15 and the filter inductors 17. The control device 13 controls the first controlled device 15 to open, and, at the same time, the second controlled device 16 to close such that the first converter assembly 5 transfers energy between the split DC link halves 8 thereby maintaining voltage regulation of the DC link 7 in respect to the midpoint reference 8.

Figure 4:
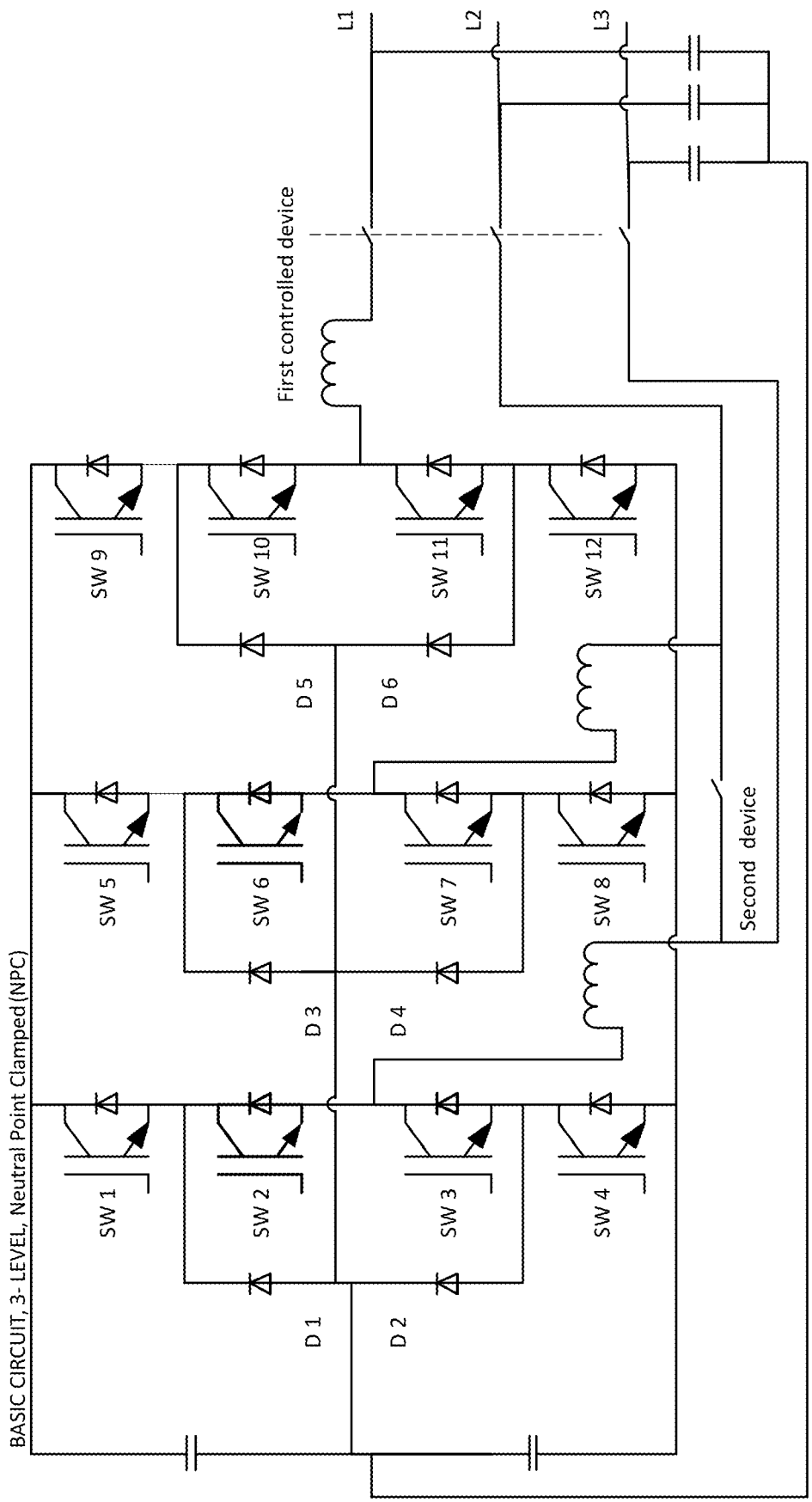
FIG. 4 shows the portion of the UPS system of FIG. 1 as a 3-level NPC-type circuit in a schematic view.

The first converters 6 can readily operate 4-quadrant such that controlled current flow is possible in any direction between the DC link 7 and phase conductors 18 connecting the midpoint reference 8 to the phases L1, L2, L3 of the AC source 3 is possible. The internal DC link midpoint reference 8 may either not pass to a source and/or load reference at a 3-wire 3-level T-type installation as shown in FIG. 3 (without reference numerals) or connected to source/load reference such as usually Neutral in a 4-wire installation as shown in FIG. 4 (without reference numerals), where Neutral is clamped.

FIGS. 5a and 5b show, for the embodiment depicted in FIG. 3, the current path of energy transfer when the first controlled device 15 is open and the second controlled device 16 is closed, whereby for simplicity reasons the third phase leg is omitted. Top left (FIG. 5a) shows with all semiconductor switches and bottom right only with active semiconductor switches as simplified view. The current path of energy transfer to bottom half of the split DC link 7 is affected through a simple reversal of control of semiconductor switches 6 and 3. The outer current path of energy transfer depicts the path of rising current, whereby energy is stored in both phase inductors 17, whereas the two other current paths of energy transfer depict a respective path of decaying current with energy of both inductors 17 going to either link half 8. For the latter, the lower current path of energy transfer (FIG. 5b) shows that energy of both inductors 17 is transferred to bottom capacitor 18 as semiconductor switch 6 conducts. The upper current path of energy transfer (FIG. 5a) shows that opposite energy flows to top capacitor 18 as semiconductor switch 3 conducts.

FIGS. 6a and 6b show a second current path alternative with less active switches in respect to the embodiment shown in FIGS. 5a and 5b, whereas for simplicity reasons only the current path for energy transfer to bottom half of the split DC link 7 is shown (lower line). Said current path shows decaying current as energy of both inductors 17 goes to either link half 8. The lower current path line depicts the decaying current path where energy is drawn from both phase inductors 17.

In FIGS. 7a and 7b, an NPC-type embodiment is shown with regard to the second current path alternative as depicted before in FIGS. 6a and 6b, whereas operation is ambiloquous to T-type as shown in the previous figure, however involving a more complicated path. For clarity reasons, in FIGS. 7a and 7b only the current path for energy transfer to bottom half of the split DC link 7 is shown (lower line) with the path of decaying current through semiconductor switch 7, diode 4, semiconductor switches 4, 3 and inductor 17, with energy of both inductors 17 going to either link half. The upper current path depicts the path of rising current through semiconductor switches 1, 2, series inductors, semiconductor switch 7 and diode 4, whereas energy is stored in both phase inductors 17. As before, bottom right (FIG. 7b) shows a simplified view with only active semiconductor switches.

FIGS. 8a and 8b show the current path when applying the proposed solution to a 2-level topology through addition of clamp semiconductor switches 2, 3 of a 3-level topology on one phase L1, L2, L3 only. Current paths and function are as described in respect to FIGS. 5a and 5b, whereas control and conduction as described in respect to FIGS. 6a and 6b is also possible.

Next, FIGS. 9a and 9b show an embodiment for operating the semiconductor switches with alternate current paths to average stress over several of the devices 1 . . . N with T-type configuration. Top left (FIG. 9a) shows, in the lower current path, energy storage paths to inductors 17 and semiconductor switches 1 and 8, whereas the upper current paths show energy storage paths to inductors 17 and semiconductor switches 5 and 4. Such way energy discharge to bottom capacitor 18 will correspondingly either have for example semiconductor switch 6 or 2 conducting. Bottom right (FIG. 9b) shows an alternative with in the lower current path energy storage paths to inductors 17 and semiconductor switches 1 and 6, and in the upper current paths energy storage paths to inductors 17 and semiconductor switches 5 and 2. Such way energy discharge to bottom capacitor 18 will correspondingly either have either semiconductor switch 3 or 7 conducting.

FIGS. 10a and 10b show, with respect to the lower current path line of FIG. 9b (bottom right), possible control schemes, namely CCM, continuous current mode, versus DCM, discontinuous current mode in regard to semiconductor switches 1 and 6.

In FIGS. 11a, 11b, and 11c, an embodiment with multiple first converters 6 in a phase leg is depicted, whereas the circuit may either operate with a common PWM for the semiconductor switches, so that less control capability is required, or interleaved Modulo-2 with a PWM pattern that is phased shifted for a PWM cycle to optimize for example filter ripple.

Lastly, FIG. 12 shows an embodiment where a third controlled device 19 and a filter element 20 are provided, which are connected in series between the first controlled device 15 and the midpoint reference 8. Thereby, the series connection can be provided respectively connected at different positions as depicted in FIG. 12, between the second controlled device 16 and the first controlled device 15 or between the phase Lx or the first controlled device 15.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST

1 . . . N UPS
2 load
3 AC source
4 DC source
5 first converter assembly
6 first converters
7 DC link
8 two halves, midpoint reference
9 second converter assembly
10 second converter
11 third converter assembly
12 third converter
13 control device
14 user interface
15 first controlled device
16 second controlled device
17 filter inductors
18 capacitor
19 third controlled device
20 filter element All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method for operating an uninterruptible power supply, UPS, for connecting a load to an AC source and a DC source, the UPS comprising:
    a first converter assembly comprising at least two first converters connected on a first side to the AC source and on a second side to a split DC link comprising two halves with a midpoint reference,
    a second converter assembly comprising a second converter connected on a first side to the DC link and on a second side to the load,
    a third converter assembly comprising a third converter connected on a first side to the DC source and on a second side to the DC link,
    a first controlled device configured for disconnecting at least two of the first converters from the AC source, and a second controlled device configured for connecting at least two of the first converters together;

wherein the method comprises the step of:

opening the first controlled device, and closing the second controlled device such that the first converter assembly transfers energy between the split DC link halves to maintain voltage regulation of the DC link in respect to the midpoint reference; and operating the first converter assembly with swapped PWM between different first converters of the at least two first converters for periodically reversing direction of current flow in respect to the different first converters.

2. The method according to claim 1, wherein the method further comprises the step of operating at least one of the at least two first converters, the second converter, and the third converter with one of a pulse width, PWM, modulation or PWM phase shifted, with an interleaved mode.

3. The method according to claim 1, wherein the second controlled device is provided as a permanently fixed connection between the at least two of the first converters.

4. The method according to claim 1, wherein the third converter assembly comprises a plurality of third converters, and wherein the method further comprises the step of operating the third converter and a further third converter of the plurality of third converters in parallel or time staggered for controlling energy draw off to a plurality of DC sources.

5. The method according to claim 1, wherein at least one of the at least two first converters, the second converter, and the third converter comprises Si, SiC and/or GaN semiconductors.

6. The method according to claim 1, wherein the method further comprises the step of periodically changing phases by opening the first controlled device in respect to two periodically different phases, and at the same time closing the second controlled device in respect to the two periodically different phases.

7. The method according to claim 1, further comprising a third controlled device and a filter element connected in series between the first controlled device and the midpoint reference.

8. The method according to claim 1, wherein the first converter assembly comprises a plurality of two level converters having a two level midpoint and at least one controlled bidirectional semiconductor switch connected between the two level midpoint and the midpoint reference.

9. The method according to claim 1, wherein the second controlled device is arranged between the first controlled device and the first converter assembly.

10. The method according to claim 1, wherein the first converter assembly comprises filter inductors associated with each first converter, and wherein the second controlled device is arranged between the first controlled device and the filter inductors.

11. The method according to claim 1, wherein the first converter assembly is provided as a rectifier, the second converter assembly is provided as an inverter, and the third converter assembly is provided as a DC/DC converter.

12. An uninterruptible power supply (UPS) for connecting a load to an AC source and a DC source, the UPS comprising:

a first converter assembly comprising at least two first converters configured for connecting on a first side to the AC source and on a second side to a split DC link comprising two halves with a midpoint reference;

a second converter assembly comprising a second converter configured for connecting on a first side to the DC link and on a second side to the load;

a third converter assembly comprising a third converter configured for connecting on a first side to the DC source and on a second side to the DC link;

a first controlled device configured for disconnecting at least two of the first converters from the AC source;

a second controlled device configured for connecting at least two of the first converters together; and a control device configured for:

opening the first controlled device, closing the second controlled device, such that the first converter assembly transfers energy between the split DC link halves to maintain voltage regulation of the DC link with respect to the midpoint reference, and operating the first converter assembly with swapped PWM between different first converters of the at least two first converters for periodically reversing direction of current flow in respect to the different first converters.

13. The UPS according to claim 12, wherein the control device is configured for operating the first converters, the second converter and the third converter with a pulse width, PWM, modulation or PWM phase shifted with an interleaved mode.

14. The UPS according to claim 12, wherein the control device is configured for periodically changing phases by opening the first controlled device with respect to two periodically different phases, and at the same time closing the second controlled device with respect to the two periodically different phases.

15. A method for operating an uninterruptible power supply, UPS, for connecting a load to an AC source and a DC source, the UPS comprising:

a first converter assembly comprising at least two first converters connected on a first side to the AC source and on a second side to a split DC link comprising two halves with a midpoint reference, a second converter assembly comprising a second converter connected on a first side to the DC link and on a second side to the load, a third converter assembly comprising a third converter connected on a first side to the DC source and on a second side to the DC link, a first controlled device configured for disconnecting at least two of the first converters from the AC source, and a second controlled device configured for connecting at least two of the first converters together, wherein the second controlled device is provided as a permanently fixed connection between the at least two of the first converters;

wherein the method comprises the step of:

opening the first controlled device, and closing the second controlled device such that the first converter assembly transfers energy between the split DC link halves to maintain voltage regulation of the DC link in respect to the midpoint reference.

16. The method according to claim 15, further comprising a third controlled device and a filter element connected in series between the first controlled device and the midpoint reference.

* * * * *